United States Patent
Mehta et al.

[19]

[11] Patent Number: 6,065,139
[45] Date of Patent: May 16, 2000

[54] METHOD AND SYSTEM FOR SURVEILLANCE OF COMPUTER SYSTEM OPERATIONS

[75] Inventors: Chet Mehta; Ronald Sterling Clark; Donald LeRoy Thorson, all of Austin, Tex.

[73] Assignee: International Business Machines Corporation, Armonk, N.Y.

[21] Appl. No.: 08/829,090

[22] Filed: Mar. 31, 1997

[51] Int. Cl.[7] .................................................. G06F 11/20
[52] U.S. Cl. ........................... 714/55; 714/2; 714/25; 714/48; 714/55
[58] Field of Search ................................. 395/181, 182, 395/183, 184, 185, 186, 187, 188, 189, 200.53, 200.54

[56] References Cited

U.S. PATENT DOCUMENTS

| | | | |
|---|---|---|---|
| 4,044,337 | 8/1977 | Hicks et al. | 364/222.81 |
| 4,095,268 | 6/1978 | Kobayashi et al. | 364/234 |
| 4,215,397 | 7/1980 | Hom | 364/136 |
| 4,360,917 | 11/1982 | Sindelar et al. | 714/54 |
| 4,511,982 | 4/1985 | Kurakake . | |
| 4,604,746 | 8/1986 | Blum . | |
| 4,965,717 | 10/1990 | Cutts, Jr. et al. | 364/228 |
| 5,142,165 | 8/1992 | Allard et al. | 307/130 |
| 5,193,181 | 3/1993 | Barlow et al. | 712/245 |
| 5,245,615 | 9/1993 | Treu | 714/3 |
| 5,249,187 | 9/1993 | Bruckert et al. | 364/187 |
| 5,251,227 | 10/1993 | Bruckert et al. | 371/12 |
| 5,267,246 | 11/1993 | Huang et al. | 714/31 |
| 5,291,600 | 3/1994 | Lutz et al. | 395/700 |
| 5,307,482 | 4/1994 | Bealkowski et al. | 712/245 |
| 5,313,628 | 5/1994 | Mendelsohn et al. | 712/245 |
| 5,317,752 | 5/1994 | Jewett et al. | 364/231.6 |
| 5,375,219 | 12/1994 | Okabe | 711/147 |
| 5,390,324 | 2/1995 | Burckhartt et al. | 714/55 |
| 5,410,706 | 4/1995 | Farrand et al. | 364/221 |
| 5,421,006 | 5/1995 | Jablon et al. | 714/38 |
| 5,437,047 | 7/1995 | Nakamura | 709/201 |
| 5,442,777 | 8/1995 | Nakajima et al. | 714/30 |
| 5,444,859 | 8/1995 | Baker et al. | 713/502 |
| 5,450,579 | 9/1995 | Johnson | 714/42 |
| 5,455,933 | 10/1995 | Schieve et al. | 710/72 |

(List continued on next page.)

FOREIGN PATENT DOCUMENTS

| | | | |
|---|---|---|---|
| WO9700480 | 3/1997 | European Pat. Off. | G06F 13/14 |
| 811929A2 | 10/1997 | European Pat. Off. | G06F 13/40 |

OTHER PUBLICATIONS

Stranko, T.A. and Swann, R.L., "Programmed Clock Synchronization in a Skewed Clock Environment," IBM Technical Disclosure Bulletin, vol. 26, No. 8, Jan. 1984.

IBM Technical Disclosure Bulletin, "Method to Initialize the Error Handling Logic of a Peripheral Component Interconnect System", vol. 37, No. 08, Aug. 1994.

IBM Technical Disclosure Bulletin, "BUS Fault Identification Algorithm", vol .32, No. 6A, Nov. 1989.

"Chapter 10: Error Detection and Handling", PCI System Architecture, 189–207.

IBM Technical Disclosure Bulletin, "Recovery from Single Critical Hardware Resource Unavailability", vol. 36, No. 08, Aug. 1993.

*Primary Examiner*—Thomas C. Lee
*Assistant Examiner*—Stacy Whitmore
*Attorney, Agent, or Firm*—Sawyer & Associates; Volel Emile

[57] ABSTRACT

Method and system aspects for monitoring computer system operations are provided. A computer system including a processor, the processor supporting firmware and a running operating system, and a service processor coupled to the processor, is monitored by initiating surveillance of the computer system in the firmware when an architected function occurs in the operating system. Monitoring additionally includes providing a pulse indicator from the firmware to the service processor and determining a status of computer system operations with the service processor based on a frequency of the pulse indicator.

16 Claims, 2 Drawing Sheets

U.S. PATENT DOCUMENTS

| | | | |
|---|---|---|---|
| 5,467,449 | 11/1995 | Gauronski et al. | 399/42 |
| 5,471,674 | 11/1995 | Stewart et al. | 364/231.1 |
| 5,475,839 | 12/1995 | Watson et al. | 380/4 |
| 5,488,688 | 1/1996 | Gonzales et al. | 714/34 |
| 5,499,346 | 3/1996 | Amini et al. | 710/128 |
| 5,530,847 | 6/1996 | Schieve et al. | 364/267.7 |
| 5,530,946 | 6/1996 | Bouvier et al. | 364/230 |
| 5,560,018 | 9/1996 | Macon, Jr. et al. | 710/260 |
| 5,564,054 | 10/1996 | Brammick et al. | 713/200 |
| 5,619,644 | 4/1997 | Crockett et al. | 714/13 |
| 5,680,537 | 10/1997 | Byers et al. | 714/5 |
| 5,712,967 | 1/1998 | Grossman et al. | 714/43 |
| 5,742,851 | 4/1998 | Sekine | 714/213 |
| 5,768,496 | 6/1998 | Lidgett et al. | 714/47 |
| 5,768,612 | 6/1998 | Nelson | 712/32 |
| 5,790,870 | 8/1998 | Hausauer et al. | 710/260 |

METHOD AND SYSTEM FOR SURVEILLANCE OF COMPUTER SYSTEM OPERATIONS

CROSS-REFERENCE TO RELATED APPLICATIONS

The present application is related to applications Ser. No. 08/829,017, now pending, entitled "Method and System for Check Stop Error Handling," filed Mar. 31, 1997; Ser. No. 08/829,088, now pending, entitled "A Method and System for Fault Isolation for PCI Bus Errors," filed Mar. 31, 1997; Ser. No. 08/829,018, now pending, entitled "Error Collection Coordination for Software-Readable and Non-Software Readable Fault Isolation Registers in a Computer System," filed Mar. 31, 1997; Ser. No. 08/829,016, now abandoned, entitled "Machine Check Handling for Fault Isolation in a Computer System," filed Mar. 31, 1997; and Ser. No. 08/829,089, now U.S. Pat. No. 5,951,686, entitled "Method and System for Reboot Recovery," filed Mar. 31, 1997.

FIELD OF THE INVENTION

The present invention relates generally to computer system surveillance and more particularly to computer system surveillance utilizing a service processor.

BACKGROUND OF THE INVENTION

To maintain proper computer system functioning, computer systems typically perform surveillance on components. For systems whose goal is to provide competitive availability and serviceability features for customers, an independent processor is included in the hardware implementation. One function provided by this independent "service processor" is the monitoring of events or signals provided by the main processor complex and its executing software and determination if a processor or software failure has occurred. Thus, the surveillance operations commonly employ explicit cooperation between the service processor and the system software (operating system and/or applications).

The cooperation often results from providing surveillance system software in the form of a device driver and/or a timer-driven application that communicates signals at regulated intervals to the service processor in the system. Unfortunately, providing surveillance system software is typically cumbersome. For example, computer system hardware may be developed with the intention of being supported by multiple operating systems. If multiple operating systems are supported on a given hardware system, then the surveillance-enabling system software must be reimplemented multiple times.

Accordingly, what is needed is a method and system for computer system surveillance with a service processor that proceeds automatically without requiring explicit changes to the operating system.

SUMMARY OF THE INVENTION

The present invention meets these needs and provides a method and system for monitoring computer system operations. In one aspect, a computer system that includes a processor, the processor supporting firmware and a running operating system, and a service processor coupled to the processor, is monitored. The method for monitoring the computer system includes initiating surveillance of the computer system in the firmware when an architected function occurs in the operating system. Additionally included in the method is providing a pulse indicator from the firmware to the service processor and determining a status of computer system operations with the service processor based on a frequency of the pulse indicator.

In a further method aspect, a computer system being monitored includes a processor and a service processor coupled to the processor, the processor including an operating system, the operating system including a facility to make periodic calls to a hardware platform of the computer system to sample for events. The method includes calling an architected function by the operating system, and determining if a surveillance interval is below a predetermined interval with the hardware platform. Further, the method includes issuing a surveillance signal to the service processor if the surveillance interval is above the predetermined interval, and responding to the surveillance signal by the service processor to indicate system malfunctions.

A computer system with automatic surveillance capabilities and that adheres to a common hardware reference platform includes a processing mechanism, the processing mechanism supporting a running operating system, the operating system calling an architected function. The computer system further includes a firmware mechanism supported by the processing mechanism, the firmware mechanism receiving the architected function call and subsequently issuing a surveillance signal when a surveillance period has been satisfied. In addition, a service processor is coupled to the processing mechanism, the service processor receiving the surveillance signal and responding to the surveillance signal to indicate system malfunctions.

With the present invention, specific software changes in the operating system or applications to support surveillance activity are avoided. Further, the utilization of the service processor and the platform's firmware advantageously provides sufficient independent means for monitoring a computer system that adheres to predefined architecture requirements. These and other advantages of the aspects of the present invention will be more fully understood in conjunction with the following detailed description and accompanying drawings.

DESCRIPTION OF THE INVENTION

The present invention relates to computer system surveillance utilizing a service processor. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

Figure 1:
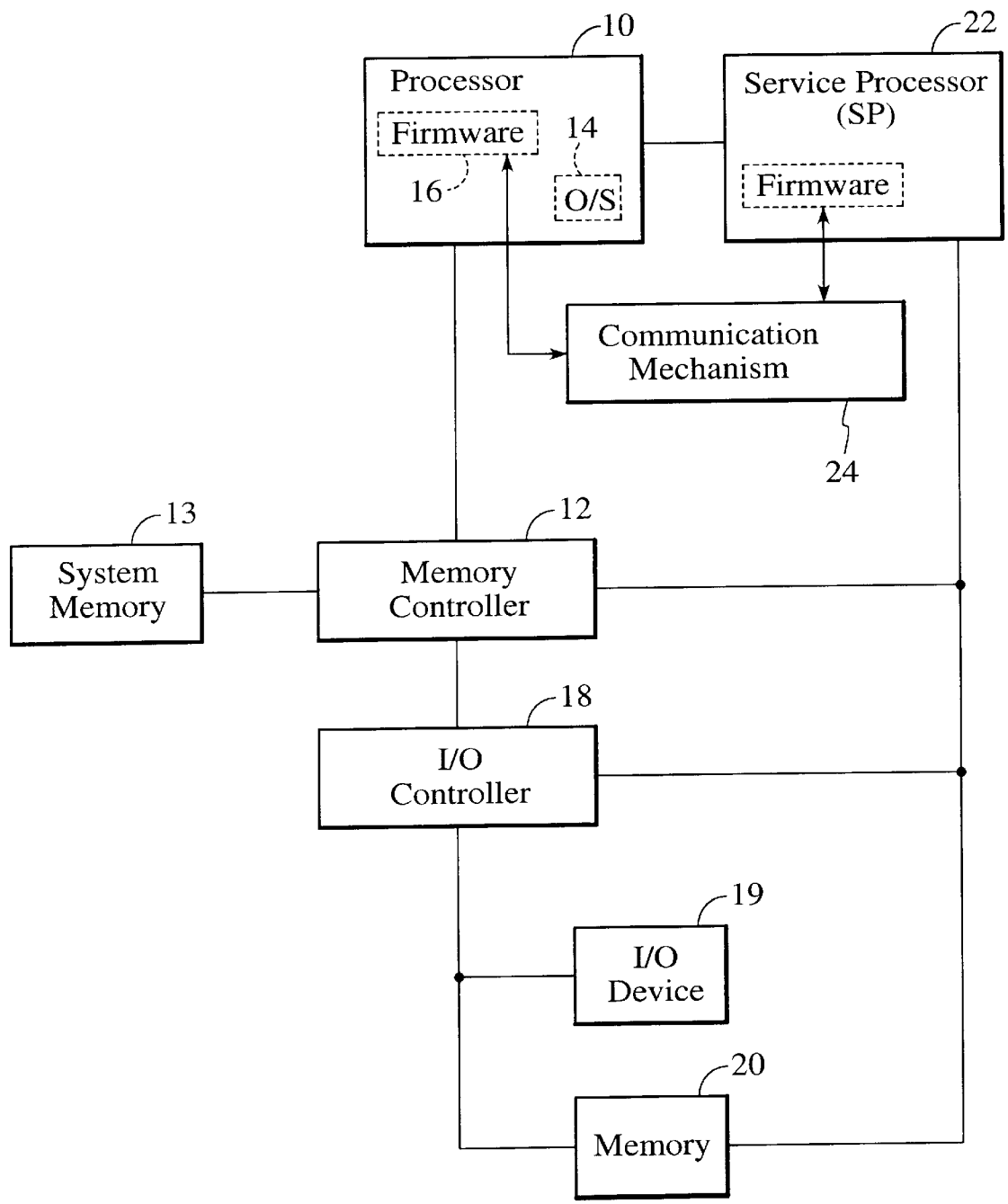
FIG. 1 illustrates a block diagram of a computer system in accordance with the present invention.

FIG. 1 illustrates a basic block diagram of a general purpose computer system for use with the present invention. As shown, the computer system includes a processor 10, such as a PowerPC™ processor from IBM Corporation, of Armonk, N.Y., coupled to memory controller 12, which controls system memory 13, i.e., RAM (random access memory) and ROM (read only memory). An operating system (O/S) 14 typically runs on the processor to perform basic tasks in the computer system and act as a platform for application programs. Also included is firmware 16 that runs on the processor 10 and is code stored in suitable memory, such as non-volatile RAM, or EPROM (erasably programmable read only memory), as is well understood to those skilled in the art.

Further, an input/output (I/O) controller 18 is coupled to the processor 10 for controlling the interactions between the processor 10 and sub-ordinate components, i.e., sub-components, such as input/output devices 19, e.g., a hard disk drive, a monitor, etc., that adhere to an input/output standard, such as a PCI standard, and a memory device 20, such as non-volatile RAM (NVRAM). Further included is an embedded controller, i.e., a service processor (SP) 22, which communicates with firmware 16 through a dedicated bidirectional communication mechanism 24, e.g., a heart beat monitor, exclusive to the firmware 16.

In providing surveillance functionality, the present invention takes advantage of a PowerPC™ Common Hardware Reference Platform (CHRP) architecture that defines a mechanism for hardware platforms to provide special firmware, i.e., firmware 16, called Run-Time Abstraction Services (RTAS), that can be accessed from a running operating system. A description of the features of CHRP may be found in *PowerPC™ Microprocessor Common Hardware Reference Platform: A System Architecture*, published by Morgan Kaufman Publishers, Inc., San Francisco, Calif., 1995. The special firmware has characteristics similar to BIOS (basic input/output system) in Intel-based computer systems.

Further, one requirement of CHRP is that operating system 14 makes periodic calls to the firmware 16 to sample for various errors or events through an architected, inquiry function named "event-scan". In accordance with the present invention, surveillance of proper functioning system operations occurs transparently to the operating system 14 through utilization of the periodic nature of the event-scan function.

Figure 2:
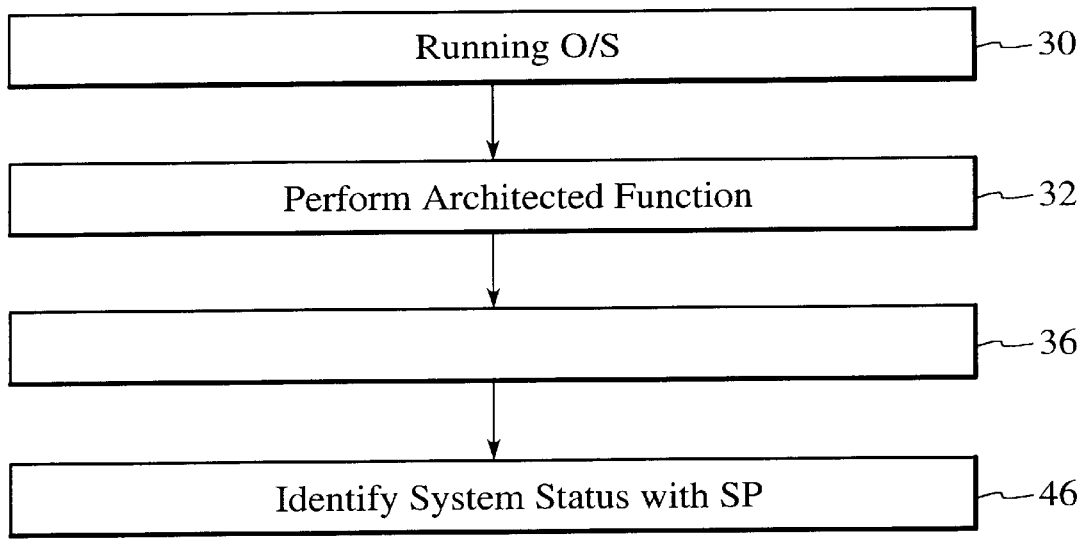
FIG. 2 illustrates a flow diagram for automatic surveillance in accordance with the present invention.

FIG. 2 illustrates an overall flow diagram of a preferred embodiment of automatic processor surveillance. The process initiates when there is a running operating system 14 (step 30). The operating system 14 then performs an architected function (step 32), i.e., the event-scan function, in accordance with CHRP specifications at a predetermined interval, e.g., at least once per minute. Once the predetermined level has been reached, the process continues with provision of firmware 16 surveillance activity based on the architected function (step 36), as discussed in more detail with reference to FIG. 3.

Figure 3:
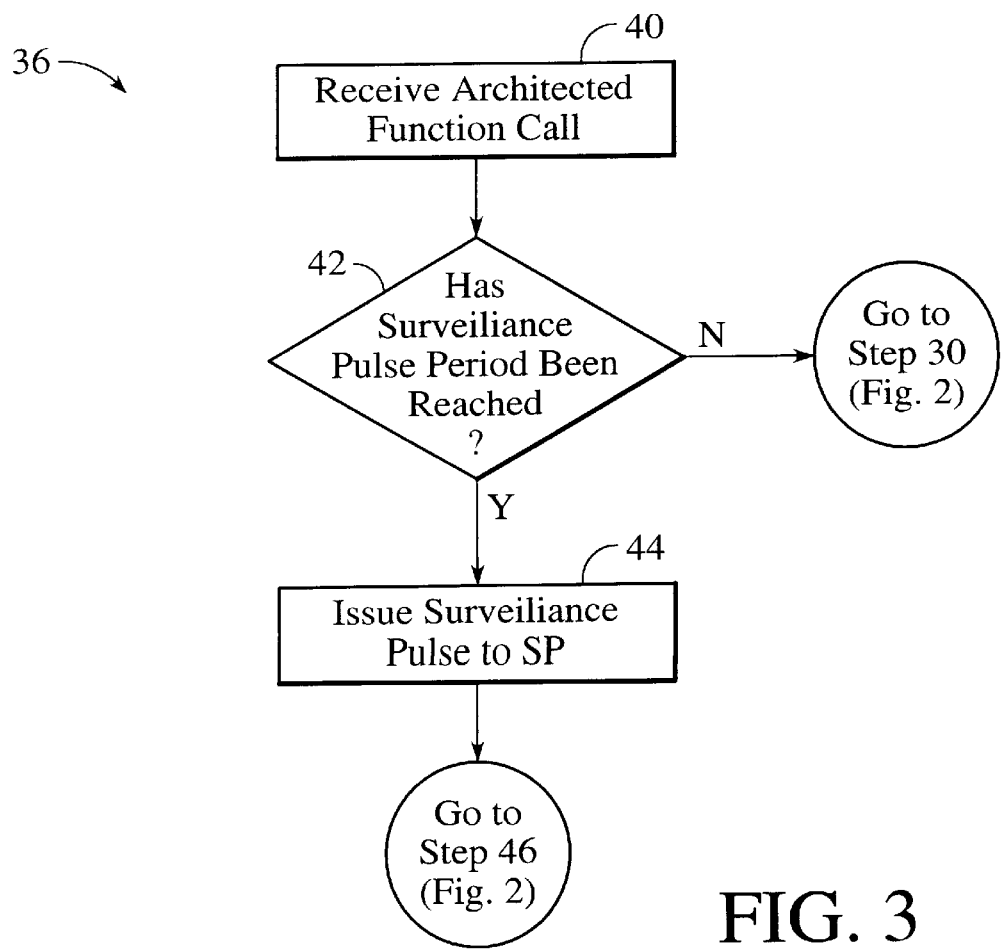
FIG. 3 illustrates a flow diagram detailing a process of utilizing firmware during automatic surveillance operations of FIG. 2.

As shown in FIG. 3, the surveillance activity commences with the calling of the architected function by the O/S 14 to the firmware 16 (step 40). The firmware 16 then determines if a surveillance pulse period/ 'heartbeat' interval has been reached (step 42). The surveillance pulse period preferably is a predetermined time period sufficient for allowing suitable system checks to occur, e.g., a one minute time period. If the surveillance period has not been reached, surveillance reporting is not required and operations continue with the running O/S 14 (step 30). For example, the architected function call may occur at a faster rate than is desired for issuing the surveillance signal. Thus, the firmware 16 waits until the appropriate surveillance pulse period has been reached. When the surveillance pulse period has been reached, the firmware 16 issues a surveillance/'heartbeat' signal to the SP 22 (step 44). The 'heartbeat' suitably indicates that the system appears to be operating properly from the firmware 16 perspective, since the operating system 14 is providing the architected function appropriately.

Referring back to FIG. 2, the process then continues with identification of the status of the system using the SP 22 (step 46). Thus, the SP 22 responds to the 'heartbeat'0 by returning any discovered errors to the firmware 16. Preferably, the SP 22 maintains an independent time base and checks that the "heartbeat" signals appear at the necessary frequency. If the "heartbeat" frequency falls outside the expected rate, the SP 22 suitably executes a tailorable recovery policy, such as providing notification of the failure to a remote service location and/or automatically restarting the system. The communication mechanism 24 suitably acts as a transfer agent for the heartbeat transmission and error data return between the firmware 16 and SP 22.

Further, for greater flexibility, the policy implemented by the SP 22 when surveillance failures are detected may be customized by the user. Suitably, customization parameters are preserved in non-volatile memory, e.g., memory 20, and are accessed by the SP 22 appropriately when necessary. Preferably, at each system initialization/initial program load (IPL), the SP 22 enforces the stored surveillance policy settings and begins monitoring system operation. Thus, no specific surveillance support is required by the operating system.

Accordingly, with the present invention, an operating system independent surveillance function is provided by utilizing a required periodic inquiry facility that is defined for the hardware platform and all supported operating systems as a basis for a surveillance signal/"heartbeat" signal. Thus, as any operating system makes the required periodic interactions with the hardware platform, an SP attempts to interpret whether the overall system is functioning properly. Implementation of recovery or notification policies by the SP thus occurs substantially independently of the operating system.

Although the present invention has been described in accordance with the embodiments shown, one of ordinary skill in the art will readily recognize that there could be variations to the embodiments and those variations would be within the spirit and scope of the present invention. For example, although the foregoing has been described in terms of a uniprocesor system, implementation in multiprocessor environments is also suitable. Accordingly, many modifications may be made by one of ordinary skill in the art without departing from the spirit and scope of the appended claims.

What is claimed is:

1. A method for monitoring computer system operations, the computer system comprising a processor, the processor supporting firmware and a running operating system, and a service processor coupled to the processor, the method comprising:

initiating surveillance of the computer system in the firmware when an architected function occurs in the operating system;

providing a pulse indicator from the firmware to the service processor; and determining a status of computer system operations with the service processor based on a frequency of the pulse indicator.

2. The method of claim 1 wherein the architected function occurs at predetermined intervals.

3. The method of claim 2 wherein the architected function comprises an event scan function.

4. The method of claim 2 wherein the predetermined intervals comprise intervals of at least once per minute.

5. The method of claim 1 wherein initiating surveillance further comprises calling an event scan function in the operating system.

6. The method of claim 1 wherein providing a pulse indicator further comprises determining whether a predetermined pulse interval has been reached, and providing the pulse indicator when the predetermined pulse interval has been reached.

7. The method of claim 6 wherein determining a status further comprises determining whether the pulse indicator occurs at the predetermined pulse interval.

8. The method of claim 7 further comprising executing a predetermined recovery policy by the service processor when the pulse indicator does not occur at the predetermined pulse interval.

9. A method for monitoring a computer system; the computer system including a processor and a service processor coupled to the processor, the processor including an operating system, the operating system including a facility to make periodic calls to a hardware platform of the computer system to sample for events; the method comprising the steps of:

a) calling an architected function by the operating system;

b) determining if a surveillance interval is below a predetermined interval with the hardware platform;

c) issuing a surveillance signal to the service processor if the surveillance interval is above the predetermined interval; and d) responding to the surveillance signal by the service processor to indicate system malfunctions.

10. The method of claim 9 wherein step (a) further comprises calling an event scan function.

11. The method of claim 9 wherein step (d) further comprises performing a predetermined recovery policy.

12. The method of claim 9 wherein step (b) further comprises determining if the surveillance interval is below one minute.

13. A computer system with automatic surveillance capabilities, the computer system adhering to a common hardware reference platform, the computer system comprising:

processing means, the processing means supporting a running operating system, the operating system calling an architected function;

firmware means supported by the processing means, the firmware means receiving the architected function call and subsequently issuing a surveillance signal when a surveillance period has been satisfied; and a service processor coupled to the processing means, the service processor receiving the surveillance signal and responding to the surveillance signal to indicate system malfunctions.

14. The computer system of claim 13 wherein the service processor responds to the surveillance signal by executing a predetermined recovery policy.

15. The computer system of claim 14 further comprising memory means for storing the predetermined recovery policy.

16. The computer system of claim 13 wherein the operating system calls an event scan function.

* * * * *